March 1, 1949.  S. B. EATON  2,462,850
TEMPERATURE CONTROLLED CRYSTAL HOLDER
Filed Feb. 9, 1945  2 Sheets-Sheet 1

INVENTOR.
STANLEY B. EATON
BY
ATTORNEY

March 1, 1949.　　　　　S. B. EATON　　　　　2,462,850
TEMPERATURE CONTROLLED CRYSTAL HOLDER
Filed Feb. 9, 1945　　　　　　　　　　　2 Sheets-Sheet 2

INVENTOR.
STANLEY B. EATON
BY
ATTORNEY

Patented Mar. 1, 1949

2,462,850

UNITED STATES PATENT OFFICE 2,462,850

TEMPERATURE CONTROLLED CRYSTAL HOLDER

Stanley B. Eaton, Berkeley Heights, N. J., assignor to Federal Telephone and Radio Corporation, New York, N. Y., a corporation of Delaware Application February 9, 1945, Serial No. 577,106

7 Claims. (Cl. 171—327)

This invention relates to constant temperature cabinets or containers particularly adapted for frequency control units for the housing of piezoelectric crystal frequency control elements as used in radio circuits requiring accurate and close frequency control under conditions wherein the apparatus may be subjected to wide variations of outside atmospheric temperatures.

A particular object of the present improvements is to provide a temperature control cabinet of the type referred to adapted, by reason of more accurate temperature control, more responsive heating control, for the maintenance of more accurate temperature control within an inner chamber in which the crystal elements are mounted. This is accomplished by the provision of a novel construction of nested chamber members with a thermostat and heater arrangement designed effectively to retard the transfer of outside temperature changes to the inner crystal chamber.

Nested chamber structures have heretofore been proposed providing an enclosing chamber or space having included therein a heating resistance thermostatically controlled for maintaining a controlled temperature surrounding an inner chamber. These however provide controlled heating by means of a spaced inner chamber member of heat conducting metal enclosing the thermal switch the action of which is responsive to or dependent on the heat conductivity of the metal. While the results obtained by this arrangement are generally satisfactory in maintaining close to uniform temperatures within a crystal compartment, I have found that greatly improved results are obtainable with the further provision, in conjunction with the heating coil in this general arrangement, of a supplemental resistance heating element incorporated within the thermostat for more direct heating action thereon. Desirably this is in an arrangement wherein heating of the bimetallic switch element or elements is effected by radiant energy. The supplemental heating element desirably comprises a turn of resistance wire in series with the main heating coil. It results in a more quickly responsive heating cycle operating to compensate for the heretofore present excessive heating incident to the time lag as related to the sole dependence on heat conductivity of the metal chamber. The special heating provision of the present invention, acting directly upon the thermostat switch control element makes the thermostat control more quickly responsive to heat changes. It accordingly triggers the action thereof whereby the time differential of the thermostat is greatly accelerated. As a result of this acceleration in the operation of the thermal control switch, the heat lag of the main heater winding is compensated for with the result that the temperature of the inner chamber more uniformly represents the average temperature of the heater controlled outer chamber.

The aforesaid and other features and advantages of the present invention will be more fully understood by reference to the accompanying drawings wherein like reference characters are applied to the corresponding parts in the several views.

Figure 1:
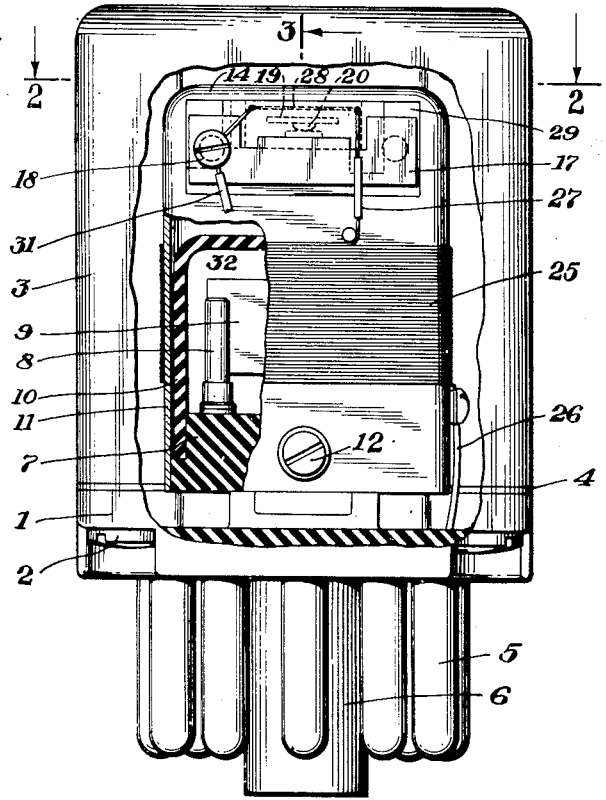
Fig. 1 is a view in side elevation of a crystal cabinet incorporating the features of the invention and wherein portions are broken away and shown in vertical section better to illustrate the construction thereof.
Figure 2:
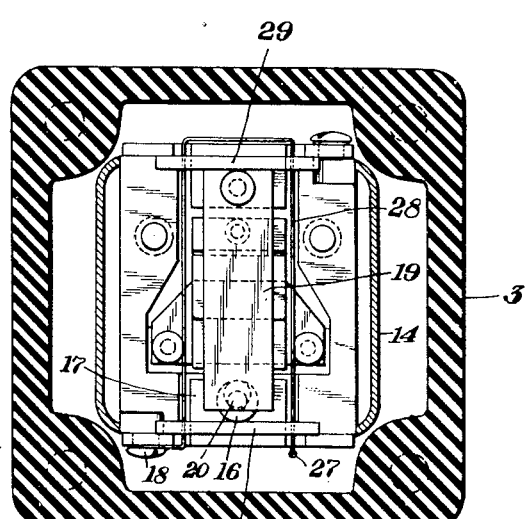
Fig. 2 is a horizontal sectional view taken on line 2—2 of Fig. 1 with the conducting chamber member shown in section.

In the preferred embodiment of the invention as illustrated the cabinet comprises an outer chamber member or casing of insulating material composed of a base portion 1 to which it is attached by screws 2 a hollow casing and outer chamber forming member 3 with a sealing washer 4 of rubber interposed between the base and cover member 3. The base is provided with a plurality of terminal contact pins 5 imbedded therein in the customary manner and downwardly projected for insertion in the terminal sockets as employed in radio apparatus. The base likewise has the usual integral positioning stud 6 formed thereon. The piezo-electric crystals are mounted on an inner base 7 of electrical and heat insulating material attached to and removable with the base 1. The inner base 7 carries the usual contact supports 8 for the crystals 9, of which three are customarily employed with electrical connection from the contact supports 8 to circuit related terminal pins 5. The outer sides of the inner base 7 are of step formation as shown to receive a slidably fitting inner crystal chamber member 10. This inner chamber is of good heat insulating material and is removable from the casing with the base.

Figure 3:
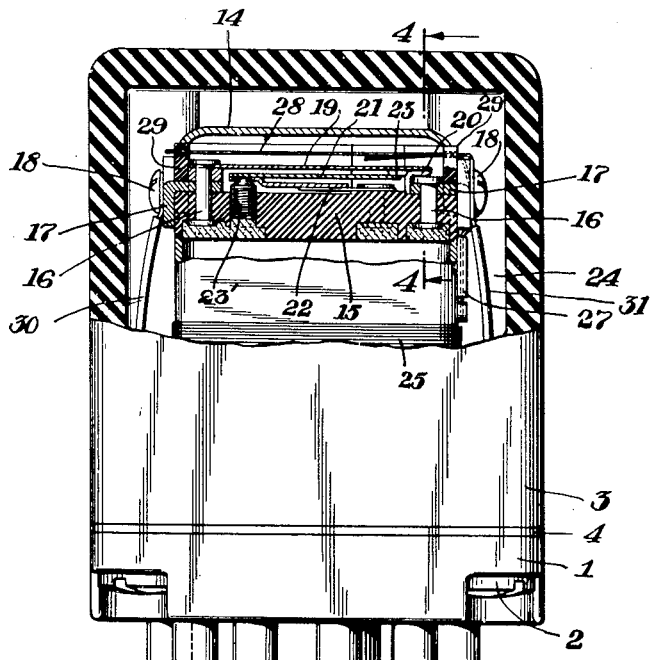
Fig. 3 is a view corresponding to Fig. 1 with the upper portion shown in central vertical section.

A heat conductive chamber member 11 of a metal having good thermal conductivity is fitted over the outer margin of the inner base 7 with a close sliding fit at its lower open end portion and is secured to the inner base by means of a screw 12. The side wall of the conductive chamber is desirably slightly spaced from the wall of the crystal chamber 10 and it is upwardly extended to provide an upper chamber for a thermally responsive switch device or thermostat 13. The thermostat is supported by insertion within oppositely positioned openings in the conductive chamber to be positioned within the compartment formed between the top wall 14 of the chamber and the top wall of the inner insulating chamber 10. As best shown in Fig. 3 the thermostat is of a standard bimetallic type and includes an insulating base support 15 having oppositely positioned terminal pins 16 and terminal members 17 electrically connected thereto and provided with the binding screws 18. It further includes the contact 19 as shown in Fig. 3 connected to the left hand pin 16 and provided at its opposite extremity with a contact 20 positioned for circuit closing engagement with the right hand terminal pin or post 16. Cooperating therewith there is positioned below the contact 19 a cooperating bimetallic strip 21 secured to a supporting plate 22 and arranged whereby its right hand free end portion will engage a lug 23 on the under side of the contact 19 and at its left hand extremity it is engaged by an adjusting screw 23' for adjustment of its operation in making and breaking contact responsive to temperature change.

Figure 5:
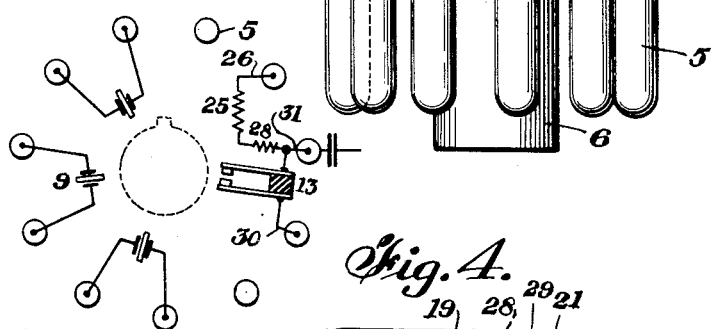
Fig. 5 is a diagrammatic showing of the circuit arrangement.
Figure 4:
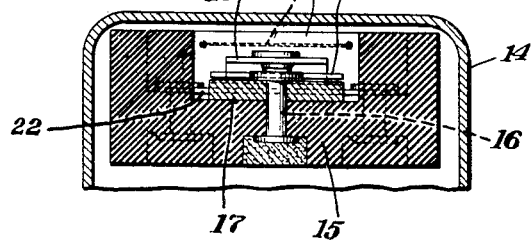
Fig. 4 is a partial vertical cross-sectional view on line 4—4 of Fig. 1.

The side and top walls of the conductive chamber member 11 are as shown spaced from the walls of the casing 3 so as to provide therebetween a compartment or space 24 which is a temperature controlled compartment, the temperature of which is controlled responsive to the action of the thermostat. The provision therefor includes a resistance heater winding 25 on the conductive chamber which may desirably be of nichrome wire held in place by a suitable insulating varnish. This winding is connected at its lower end to one of the contact pins by means of lead 26 and at its upper end is connected by means of lead 27 to a resistance wire or single turn coil 28 threaded through suitable apertures in the insulating end supports 29 of the thermostat whereby its longitudinal tangent portions are in close but insulatingly spaced relation to the bimetallic contact of the switch. This resistance coil 28 which may be referred to as a trigger resistance winding is in effect a continuation of the coil 25 or in series therewith with its end connected to one of the terminal screws 18 of the thermostat. The other terminal screw 18 of the switch is connected by a lead 30 to another of the terminal pins 5 for completion of the switch controlled heating circuit through the switch contact. Also in the circuit as shown a lead 31 is connected to the terminal screw to which the trigger winding is connected, this lead being also connected to a third terminal pin 5 in a circuit including a condenser for the connection of the latter across the thermostat as shown in Fig. 5.

In the arrangement described the crystals 9 are mounted to be located within the inner compartment or dead air chamber 32 formed by the chamber member 10 of heat insulating material. This chamber member is contained within the conductive material chamber 11 with a surrounding space or compartment 24 as described. Any change in the ambient temperature outside of the outer housing 3 will gradually alter the temperature of heat controlled compartment 24 and change in the temperature of the atmosphere therein will effect the operation of the thermostat in the manner readily understood. This will result in energizing of the heater winding 25 and the supplemental or trigger winding 28 in series therewith when the temperature drops below the normal temperature for which the thermostat is set. This will operate to oppose the temperature drop in the controlled compartment 24 before it has an opportunity for appreciable transmission of heat through the insulated inner housing 10. Upon this rise in temperature the thermostat, in response thereto, will open its contacts for breaking of the heater circuit and this action will be accelerated by the supplemental heating influence of the resistance wire on coil 28 positioned in insulated but close spaced relation to the bimetallic switch element or elements thereby materially expediting the circuit opening cycle in a manner and to a degree to compensate for the time lag as required for the transmission of the heat by conduction alone. It accordingly operates to overcome the tendency to overheating in connection with the heating cycle and further materially accelerates the cycles of operation in a manner to obtain a better balance or averaging of the heat transmission. The base construction is of substantial thickness and is made of good thermal insulation whereby temperature changes by heat losses therethrough is reduced to a negligible degree.

In the improved arrangement as disclosed the supplemental or trigger action resistance wire 28 is particularly effective in producing more quickly responsive action and more rapid heating of the bimetallic switch operating contact in that the latter is heated and as a result of direct radiant energy transmission. The described device has proven to be capable of limiting the variations in the rate of crystal oscillation caused by changes in temperature to not more than about ±7 cycles per million during outside temperature changes between −40° F. and +158° F. and even with substantial variations in heater voltages. The cabinet is extremely compact and of a form lending itself to economical manufacture and the parts thereof are conveniently separable for inspection and maintenance purposes.

What is claimed is:

1. A temperature controlled frequency determining unit comprising outer and inner chamber members spaced to form a temperature controlled compartment therebetween, said inner chamber member being of thermally conductive material, a resistance heater in said compartment, a heater controlling thermostat supported by the inner chamber member and including a thermally responsive contact, a supplemental resistance heater in insulated and close spaced relation to the contact, frequency determining elements mounted within the inner chamber member, means for thermally insulating said elements from the walls of said inner chamber member, and circuit connections to the heaters and frequency determining elements.

2. A temperature controlled frequency determining unit comprising outer and inner chamber members spaced to form a temperature controlled compartment therebetween, a main resistance winding in said compartment, a heater controlling thermostat within the outer chamber member including a thermally responsive contact, a supplemental resistance wire in close spaced relation to the contact and connected in series with the main heater winding, frequency determining elements mounted within the inner chamber member, means for thermally insulating said elements from the walls of said inner chamber member, and circuit connections to the heaters and frequency determining elements.

3. A temperature controlled frequency determining unit comprising nested outer and inner chamber members, said inner members including a heat conductive chamber spaced from the outer member to provide a temperature controlled compartment substantially surrounding the inner members and an inner member of heat insulating material within the conductive member, a resistance heater winding on the conductive member within said compartment, a heater controlling thermostat supported by the conductive member and including a thermally responsive contact, a supplemental resistance wire in insulated and close spaced relation to the contact, frequency determining elements mounted within the inner insulating chamber member and circuit connections to the heaters and frequency determining elements.

4. A temperature controlled frequency determining unit comprising nested outer and inner chamber members, said inner members including a heat conductive chamber spaced from the outer member to provide a temperature control compartment substantially surrounding the inner members and an inner member of heat insulating material within the conductive member, a resistance heater winding on the conductive member within said compartment, a heater controlling thermostat positioned between the inner insulating member and the conductive member and including a thermally responsive contact, a supplemental resistance heater in insulated and close spaced relation to the contact, frequency determining elements mounted within the inner chamber member and circuit connections to the heaters and frequency determining elements.

5. A temperature controlled frequency determining unit comprising heated outer and inner chamber members, said inner members including a heat conductive chamber spaced from the outer member to provide a temperature controlled compartment substantially surrounding the inner members and an inner member of heat insulating material within the conductive member, a main resistance heater winding on the conductive member within said compartment, a heater controlling thermostat supported on the conductive member and including a thermally responsive contact, a supplemental resistance wire connected in series with the main resistance winding and positioned in insulated and close spaced relation to the contact, frequency determining elements mounted within the inner chamber member and circuit connections to the heaters and frequency determining elements.

6. A temperature controlled frequency determining unit comprising nested outer and inner chamber members, said inner members including a heat conductive chamber spaced from the outer member to provide a temperature control compartment substantially surrounding the inner members and an inner member of heat insulating material within the conductive member, a main resistance heater winding on the conductive member within said compartment, a heater controlling thermostat positioned between the top wall of the inner insulating member and the conductive member and including a thermally responsive contact, a supplemental resistance heater in series with the main heater and positioned in insulated and close spaced relation to the contact, frequency determining elements mounted within the inner chamber member and circuit connections to the heaters and frequency determining elements.

7. A temperature controlled cabinet for frequency determining elements comprising a base, nested outer and inner chamber members detachably supported on the base, said inner members including a heat conductive chamber spaced from the outer member to provide a temperature control compartment substantially surrounding the inner members and an inner member of heat insulating material within the conductive member, a main resistance heater winding on the conductive member within said compartment, a heater controlling thermostat positioned between the inner insulating member and the conductive member and including a thermally responsive contact, a supplemental resistance heater connected in series with the main heater and positioned in insulated and close spaced relation to the contact, frequency determining elements mounted on the base to be positioned within the inner chamber member and circuit connections to the heaters and frequency determining elements.

STANLEY B. EATON.

REFERENCES CITED

The following references are of record in the file of this patent:

UNITED STATES PATENTS

| Number | Name | Date |
| --- | --- | --- |
| 1,621,023 | Newell | Mar. 15, 1927 |
| 1,758,177 | Skinner | May 13, 1930 |
| 1,940,599 | Marrison | Dec. 19, 1933 |
| 1,967,184 | Clapp et al. | July 17, 1934 |
| 2,102,783 | Bokovoy | Dec. 21, 1937 |
| 2,149,892 | Klahn | Mar. 7, 1939 |
| 2,203,545 | Peterson | June 4, 1940 |